(12) United States Patent
Caruana et al.

(10) Patent No.: US 11,082,517 B2
(45) Date of Patent: Aug. 3, 2021

(54) CONTENT TRANSFORMATIONS USING A TRANSFORMATION NODE CLUSTER

(71) Applicant: Alfresco Software, Inc., San Mateo, CA (US)

(72) Inventors: David Caruana, London (GB); Ray Gauss, Baltimore, MD (US)

(73) Assignee: Hyland Software, Inc., San Mateo, CA (US)

( * ) Notice: Subject to any disclaimer, the term of this patent is extended or adjusted under 35 U.S.C. 154(b) by 0 days.

(21) Appl. No.: 16/186,310

(22) Filed: Nov. 9, 2018

(65) Prior Publication Data

US 2019/0079982 A1  Mar. 14, 2019

Related U.S. Application Data

(63) Continuation of application No. 14/308,562, filed on Jun. 18, 2014, now Pat. No. 10,133,798.

(51) Int. Cl.
*H04L 29/08* (2006.01)
*H04L 29/06* (2006.01)

(52) U.S. Cl.
CPC ...... *H04L 67/2823* (2013.01); *H04L 67/1012* (2013.01); *H04L 67/1014* (2013.01); *H04L 67/42* (2013.01)

(58) Field of Classification Search
CPC ............. G06F 7/30563; H04L 67/2823; H04L 67/1014; H04L 67/1012
See application file for complete search history.

(56) References Cited

U.S. PATENT DOCUMENTS

| | | | |
|---|---|---|---|
| 6,407,680 B1* | 6/2002 | Lai | H04N 7/17318 341/50 |
| 7,810,025 B2 | 10/2010 | Blair et al. | |
| 8,856,800 B2 | 10/2014 | Vecera et al. | |
| 8,949,258 B2 | 2/2015 | Pryor-Miller et al. | |
| 8,949,294 B2 | 2/2015 | Surtani et al. | |
| 9,063,912 B2 | 6/2015 | Seibert, Jr. et al. | |
| 2003/0041095 A1* | 2/2003 | Konda | G06F 16/258 709/201 |
| 2003/0126202 A1* | 7/2003 | Watt | G06F 9/4401 709/203 |

(Continued)

FOREIGN PATENT DOCUMENTS

EP  2110743 A1  10/2009

*Primary Examiner* — Asher D Kells
(74) *Attorney, Agent, or Firm* — Mintz Levin Cohn Ferris Glovsky and Popeo, P.C.

(57) ABSTRACT

A method for content transformation using a transformation node cluster. The transformation node cluster may comprise a plurality of nodes including a plurality of transformation nodes configured to execute one or more content transformation types. A request may be received from a client machine for a content item stored in a repository associated with a server machine that is associated with the transformation node cluster. A current content format of the content item and a target content format of the content item may be identified. The target content format may differ from the current content format. A chain of transformations may be determined as including a first transformation type for transforming the content item from the current content format to an intermediate content format.

20 Claims, 5 Drawing Sheets

(56) References Cited

U.S. PATENT DOCUMENTS

| | | | |
|---|---|---|---|
| 2003/0158913 A1* | 8/2003 | Agnoli | H04L 67/1002 709/219 |
| 2005/0198200 A1 | 9/2005 | Subramanian et al. | |
| 2006/0026599 A1 | 2/2006 | Herington et al. | |
| 2006/0041840 A1 | 2/2006 | Blair et al. | |
| 2009/0119322 A1* | 5/2009 | Mills | G06F 17/30017 |
| 2010/0131674 A1* | 5/2010 | Vecchio | H04N 21/2343 709/246 |
| 2011/0289512 A1 | 11/2011 | Vecera et al. | |
| 2012/0226823 A1* | 9/2012 | Livnat | G06F 21/10 709/246 |
| 2012/0246202 A1 | 9/2012 | Surtani et al. | |
| 2013/0198600 A1 | 8/2013 | Lockhart et al. | |
| 2013/0238969 A1* | 9/2013 | Smith | G06F 17/212 715/230 |
| 2015/0012658 A1* | 1/2015 | Elmore | H04L 65/4061 709/226 |
| 2015/0341407 A1* | 11/2015 | Agnoli | H04L 65/607 709/219 |
| 2015/0370870 A1 | 12/2015 | Caruana et al. | |

\* cited by examiner

CONTENT TRANSFORMATIONS USING A TRANSFORMATION NODE CLUSTER

CROSS-REFERENCE TO RELATED APPLICATION

This application claims priority to and is a continuation of U.S. patent application Ser. No. 14/308,562 filed Jun. 18, 2014 entitled "CONTENT TRANSFORMATIONS USING A TRANSFORMATION NODE CLUSTER," the content of which is incorporated herein by reference in entirety.

TECHNICAL FIELD

The subject matter described herein relates to content management systems (CMS) and, in some implementations, more specifically to an elastically scalable content transformation service for transforming cloud-based content from a source format to a destination format and to transforming of content items using a transformation node cluster.

BACKGROUND

Enterprise content management (ECM) covers a broad range of applications, including document management (DM), Web content management (WCM), records management (RM), digital asset management (DAM), search of managed content, and the like. A content management system (CMS) suitable for managing the various content items (also referred to herein in some examples as files, documents, or the like) that an enterprise produces or generates, retains or otherwise stores, manipulates or modifies, etc. can support the requirements of one or more of such applications, and optionally other requirements, to provide a coherent solution in which content and management processes are capable of accessing content across a variety of applications subject to access controls, permissions, and the like. An "enterprise" can generally refer to an organization, such as for example a business or company, a foundation, a university, or the like, and can have content requirements related to one or more business processes, content uses, etc.

A CMS manages the actual digital binary content in a content item, the metadata that describes a context of each content item, associations between a content item and other content or content items, a place and classification of a content item in a repository, indexes for finding and accessing content items, etc. The CMS can also manage processes and lifecycles of content items to ensure that this information is correct. The CMS can further manage one or more processes (e.g. business processes, workflows, or the like) for creating, capturing, storing, manipulating, editing, and distributing content items, as well as all parts of a content item lifecycle (e.g., long a content item is retained, what actions are taken after the end of a retention period, etc.).

A CMS for use in enterprise content management can include one or more of document management tools, applications, and interfaces to support general office work, search, and discovery. Workflow management capabilities of a CMS can support numerous business processes, optionally including, but not limited to, case management, review and approval, and the like. Collaboration applications and services of a CMS can support the collaborative development of information and knowledge in the creation and refinement of content and documents. Web content management services of a CMS, which can be scalable, can support the delivery and deployment of content from the enterprise to its customers. Records management capabilities of a CMS can optionally capture and preserve records based upon government-approved or other standards. A standards-based platform can also provide access to applications that use these standards, such as publishing, image management, email management, etc.

Services and controls for managing content of a CMS can include features such as metadata management, version control, lifecycle management, workflow, search, associations to other content, tagging, commenting, etc. that allow users of the CMS to find desired content items among very large content collections that can span multiple parts of an enterprise. Accuracy and consistency of the information can also be ensured, even for very large content collections across an enterprise. Content and other information in a CMS can be presented, published, etc. through the Web or any other channel appropriate to allow users to access that information.

SUMMARY

As discussed in greater detail below, features of the current subject matter can include capabilities relating to efficient transformation of content items from a source format to a target format. A router node can receive a transformation request identifying a content item and a target format for the content item. The router node can direct the request to one or more transformation nodes within a transformation node cluster. The one or more transformation nodes can be pre-configured to perform specific transformation required as at least part of a transformation chain to convert a content item from its source format to the target format.

In accordance with one or more embodiments, a method for content transformation using a transformation node cluster is provided. The transformation node cluster may comprise a plurality of nodes including a plurality of transformation nodes configured to execute one or more content transformation types. A request may be received from a client machine for a content item stored in a repository associated with a server machine that is associated with the transformation node cluster. A current content format of the content item and a target content format of the content item may be identified. The target content format may differ from the current content format. A chain of transformations may be determined as including a first transformation type for transforming the content item from the current content format to an intermediate content format.

A first node of the plurality of transformation nodes may be selected based on the current content format and the target content format or the intermediate content format matching at least one of the plurality of content transformation types for which the first node is configured. The content item may be routed to the first node configured to execute the first transformation type of the plurality of content transformation types determined for the content item. A reference may be transmitted to a transformed content item resulting from the first node. The reference may identify a location in the repository where the transformed content item is stored. In some variations, the transformed content item is in the intermediate content format.

In one aspect, a computer-implemented method includes a router node of a transformation node cluster that includes a plurality of nodes receiving a request from a client machine for a content item stored in a repository associated with a server machine that is associated with the transformation node cluster. The transformation node cluster includes a plurality of transformation nodes, and each of the plurality of transformation nodes is configured to execute at least one, but not all, of a plurality of content transformation types. The method further includes the router node identifying a current content format of the content item and a target content format of the content item where the target content format differs from the current content format. Based on the identifying, the router determines one or more transformation types from the plurality of content transformation types for transforming the content item to the target format. The router node routes the content item to one of the plurality of transformation nodes in the transformation node cluster. The one of the plurality of transformation nodes is configured to execute one of the one or more content transformation types determined for the content item.

In some variations, one or more of the following features can optionally be included in any feasible combination. Each of the plurality of transformation nodes can optionally be configured to execute only one of the plurality of content transformation types. The server machine can optionally be connected with the transformation node cluster by a communication network. The plurality of transformation types can include a transformation type that includes transforming the content item from the current content format (e.g. a portable document format) into the target content format, which includes the content item split into two or more sections (e.g. in the portable document format). The plurality of transformation types can include transforming the content item from the current content format in an editable text document format into a target content format of an image format. A number of the plurality of transformation nodes in the transformation node cluster configured to execute each of the plurality of content transformation types is based on an estimate of transformation loads of different transformation types to be handled by the transformation node cluster.

The one or more transformation types determined by the router can include a transformation chain comprising a plurality of transformation types. The one of the plurality of transformation nodes in the transformation node cluster can have a first transformation type to transform the content item to a first intermediate content item having a first intermediate format. The method can further include routing the first intermediate content item to a second node of the plurality of transformation nodes in the transformation node cluster having a second transformation type to transform the first intermediate content item to either a second intermediate content item having a second intermediate format or to a target content item having the target format. The transformation chain can include a transformation type resulting in formation of multiple intermediate content items, and each of the multiple intermediate content items requires a subsequent transformation. The method can further include the router routing the multiple intermediate content items to multiple transformation nodes in the transformation node cluster. The multiple transformation nodes can each be configured to execute a same one of a plurality of content transformation types such that the multiple intermediate content items are processed in parallel.

The method can also further include the router creating a transient handler that manages the request. The router also tags the request with a handler context and a request identifier, and maps a response received from the one of the plurality of transformation nodes and containing the handler context and request identifier back to the request and to the transient handler. The transient handler keeps a record of the response and notifies the router when all transformations of a first transformation type of the one or more transformation types has been completed. The router can route intermediate content items resulting from the first transformation type to one or more additional nodes of the plurality of transformation nodes in the transformation node cluster. The one or more additional nodes of the plurality of transformation nodes can be configured to transform the intermediate content items to one or more next intermediate content items or to the target content format of the content item.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a content management system, an enterprise resource management system, a records management system, or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
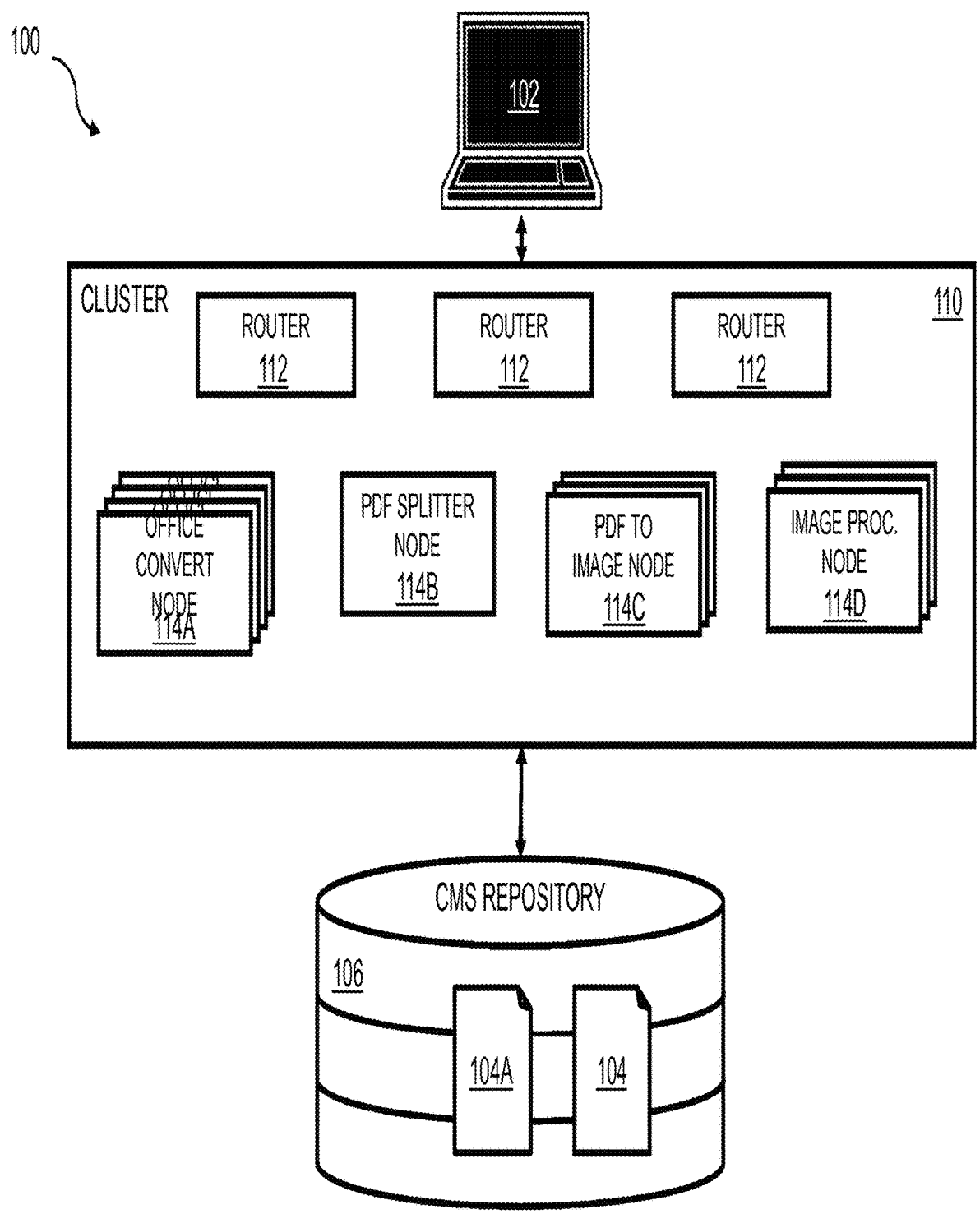
FIG. 1 shows a diagram illustrating a system having features consistent with implementations of the current subject matter.

Implementations of the current subject matter can, among other possible advantages, provide elastic scalability approaches for cloud-based content transformations, features of which are illustrated in the diagram 100 of FIG. 1, which shows an example of a computing framework or architecture consistent with such approaches. A client machine 102 can be a desktop or laptop computer or workstation, a server, a mobile device (e.g. a tablet or smartphone, etc.), or any other machine that can request a content item 104 needed by the client machine 102. The content item 104 can have a current content format. If the current content format is consistent with a target content format needed by the client machine 102, the content item 104 can be delivered directly to the client machine 102, for example by accessing the content item 104 from a content management repository 106 where the content item 104 is maintained. However, if the current content format is not consistent with (e.g. equivalent to) the target content format, a content transformation can be required to provide the content item 104 to the client machine 102 as a transformed content item having the target content format. A call or request for a content item can originate at the client machine from a web application, a native application, a server application, a command line utility, a mobile application (e.g. an "app") or the like executing at the client machine 102.

Such transformations can be accomplished using a transformation node cluster 110. The transformation node cluster 110 can include a plurality of nodes (e.g. computing nodes), which can include physical and/or virtual machines. One or more nodes of the plurality of nodes in the cluster 110 can be designated as a router node 112, which can receive requests from one or more client machines 102. For each requested content item 104 the router node 112 identifies the current content format of the content item 104 and a target content format of the content item 104 needed by the requesting client machine 102. Based on the identifying, the router node 112 can direct the content item 104 to a transformation node of a plurality of transformation nodes in the transformation node cluster 110. Each such transformation node can be configured to handle a specific type of content transformation, for example from a first content format to a second content format. Optionally, a transformation node within the transformation node cluster 110 can be configured to handle more than one specific type of content transformations. However, a transformation node generally is not configured to perform all of the possible content transformations available to be performed by the transformation node cluster 110. In FIG. 1, the transformation node cluster 110 includes four examples of transformation nodes: first transformation nodes 114A configured to convert Microsoft Office format documents to an image format (e.g. JPEG, GIF, etc.), a second transformation node 114B configured to split PDF documents into smaller groups of pages, third transformation nodes 114C configured to convert PDF files to image files, and fourth transformation nodes 114D configured for image processing (e.g. to change an image size, resolution, etc.). A router node 112 can also optionally function as a transformation node 110.

The transformation node cluster 110 can be configurable in that transformation nodes can be assigned to any defined transformation (current content format to target content format). An administrator can assign the transformation nodes among available defined transformations. Alternatively or in addition, router nodes can also configure themselves (e.g. without human interaction). For example, a router node can determine (or otherwise obtain or receive information regarding) which transformation nodes are available within the cluster and also which transformation types are supported on each transformation node. Load balancing can be accomplished automatically as the router nodes 112 direct content items for transformation simply based on their current and target content formats. Nodes in the transformation node cluster 110 can also be reconfigurable without human interaction. For example, a wait time or other metric indicative of system efficiency can be monitored, and if a threshold of the metric is crossed, one or more of the transformation nodes can be assigned a new defined transformation among the group of available defined transformations.

A client machine can be configured to include a transformation client library or other resource that can include addresses of one or more router nodes 112. Such router node addresses can be explicitly designated, or can be dynamically discoverable based on an elastic search of available router nodes, virtual machines tagged in a cloud computing framework (e.g. Amazon Web Services available from Amazon, Inc. of Seattle, Wash.), or the like. A client library consistent with implementations of the current subject matter can act as an application programming interface (API) to the transformation cluster. When called, the client library can cause the client machine 102 to pass the request, which can include a content item reference (e.g. indicating which content item or items are needed by the client machine 102) and one or more criteria describing a desired target content format for the content item 104. These criteria can include one or more of a target MIME type, a number of pages, a target resolution, etc. The request can also include a callback routine, which the router node 112 can execute upon completion of the transformation to notify the client machine 102 of the location of the transformed content item, which can be stored in the CMS repository 106. Use of a callback routine as described allows the client machine 102 to not need to wait for completion of the content transformation. Rather, the client machine 102 can progress without completion of the content item transformation, for example by continuing to render a page, a view, etc. within which the transformed content item 104A will appear. When the router node 112 executes the callback routine upon completion of the transformation or transformations required to produce the content item in the target format, the router node 112 passes a transformed content item reference to the client machine 102, and the client machine inserts the transformed content item as necessary.

In the approach discussed above, and consistent with implementations of the current subject matter, the client machine 102 is not required to ever actually store the content item 104 or the transformed content item 104A. Rather, the client machine 102 only needs to have a link or other identifier or reference to the content item 104 such that the router node 112 can command a transformation node 114 configured to perform at least part of the required transformation to access the content item 104 from the CMS repository 106, to perform the transformation for which the transformation node 114 is configured, and to store a transformed content item 104A. In some examples in which the content item 104 can be converted to a target format in one transformation, the transformed content item 104A can be referenced in the callback from the router node 112 to the client machine 102. In other examples, transforming a content item 104 to a target format can require a chain of transformations, which can sequentially convert a content item 104 into one or more intermediate format transformed content items 104A which are in turn converted either to the target format or to yet another intermediate format. The callback from the router node 112 to the client machine can optionally include a reference only to the transformed content item 104A having the target format. Optionally, additional information can be included in the callback, such as for example a reference to the original content item (e.g. untransformed), an array of transformed content item references (e.g. to reference all or at least some of the intermediate format transformed content items stored in the CMS repository 106), a listing of any options specified in the request, a history or other listing of operations performed to convert the content item 104 to the target format and/or transformation node(s) involved in the transformation or chain of transformations, etc.

Figure 2:
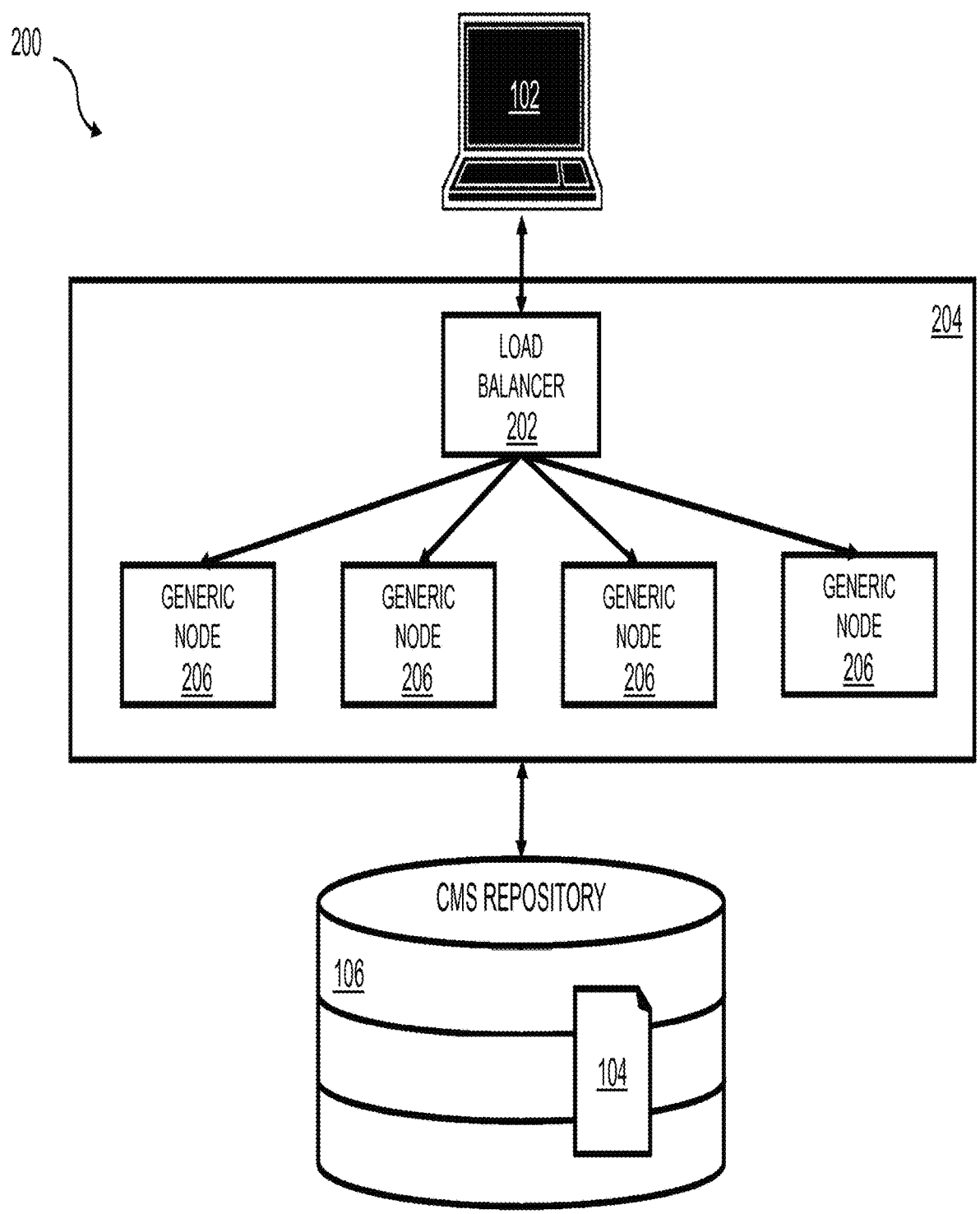
FIG. 2 shows a diagram illustrating aspects of a load balancing arrangement.

In contrast to the approach described above with reference to FIG. 1, conventional approaches to content transformation generally resemble that illustrated in the diagram 200 of FIG. 2. A content transformation is more typically handled in a distributed manner using one or more load balancers 202. A load balancer 202 can assign transformation operations among a group 204 of generic processing nodes 206 according to a load balancing algorithm. The generic processing nodes 206 are not preconfigured to perform a specific transformation type, but are instead configured to receive a content item reference and to perform whatever operations might be required to convert the content item 104 to the target format.

Figure 3:
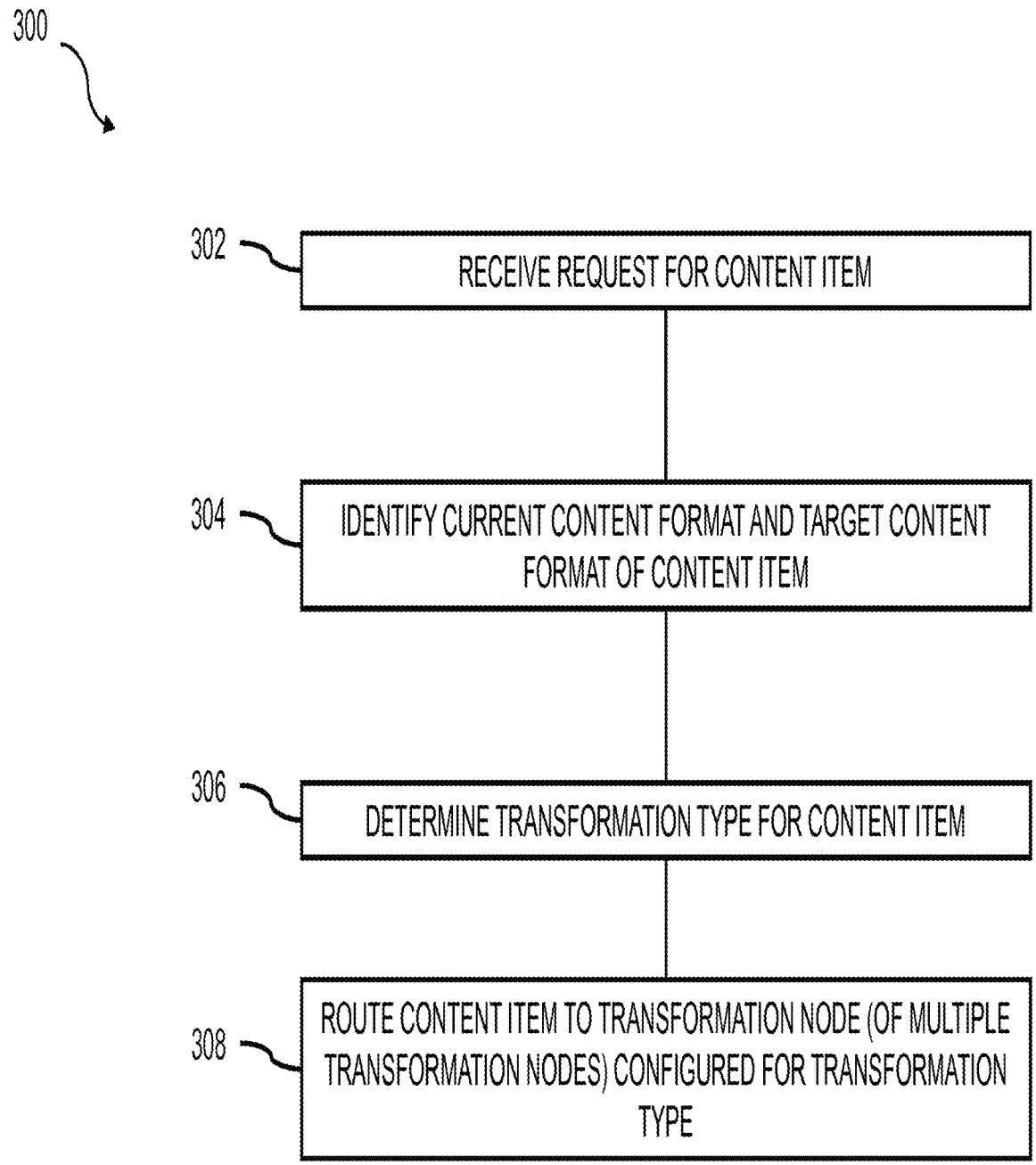
FIG. 3 shows a process flow diagram of a method for elastic scalability for cloud-based content transformations consistent with implementations of the current subject matter.

FIG. 3 is a process flow diagram of a method 300 for elastic scalability for cloud-based content transformations. At 302 a router node of a transformation node cluster receives a request from a client machine for a content item stored in a repository associated with a server machine. The server machine is associated with the transformation node cluster (which can optionally include being connected with the transformation node cluster by a communication network). The transformation node cluster further includes a number of transformation nodes, each of which are configured to execute at least one, but not all, of a plurality of content transformation types. A number of each of the different transformation nodes can be based on an estimated load of the transformation type. For instance, if a larger number of transformations are to convert the content type from a Microsoft® Word document to a Portable Document Format (PDF), then a corresponding percentage of the transformation nodes will be provided as Word document-to-PDF document transformation types.

At 304 the router node identifies a current content format of the content item and a target content format of the content item. In some instances, the current content format and the target content format will be the same, in which instances the router node routes the content item or alternatively a content item reference (e.g., a link, address, or other location of the content item in the repository) directly to the requesting client machine without any transformation. However, in other instances, the target content format differs from the current content format, and at 306, based on the identifying, a transformation type for the content item is determined. At 308 the router node routes a request to transform the content item to one or more of the number of transformation nodes in the transformation node cluster that is configured to execute the content transformation type determined for the content item. In some examples, the content item can be identified by a content item reference, which can be part of the request to transform the content item. The transformation node performs at least one operation on the content item required to convert the content item to the transformed content item. As discussed further below, transforming a content item form a current content item format to a target item format requested by a client machine can in some cases require two or more transformations to occur in a transformation chain. The router node can be configured to track progress of the transformations occurring in such a transformation chain and, if necessary to reassemble multiple parts of a split or separated content item or intermediate content item to form the target content item.

Figure 4:
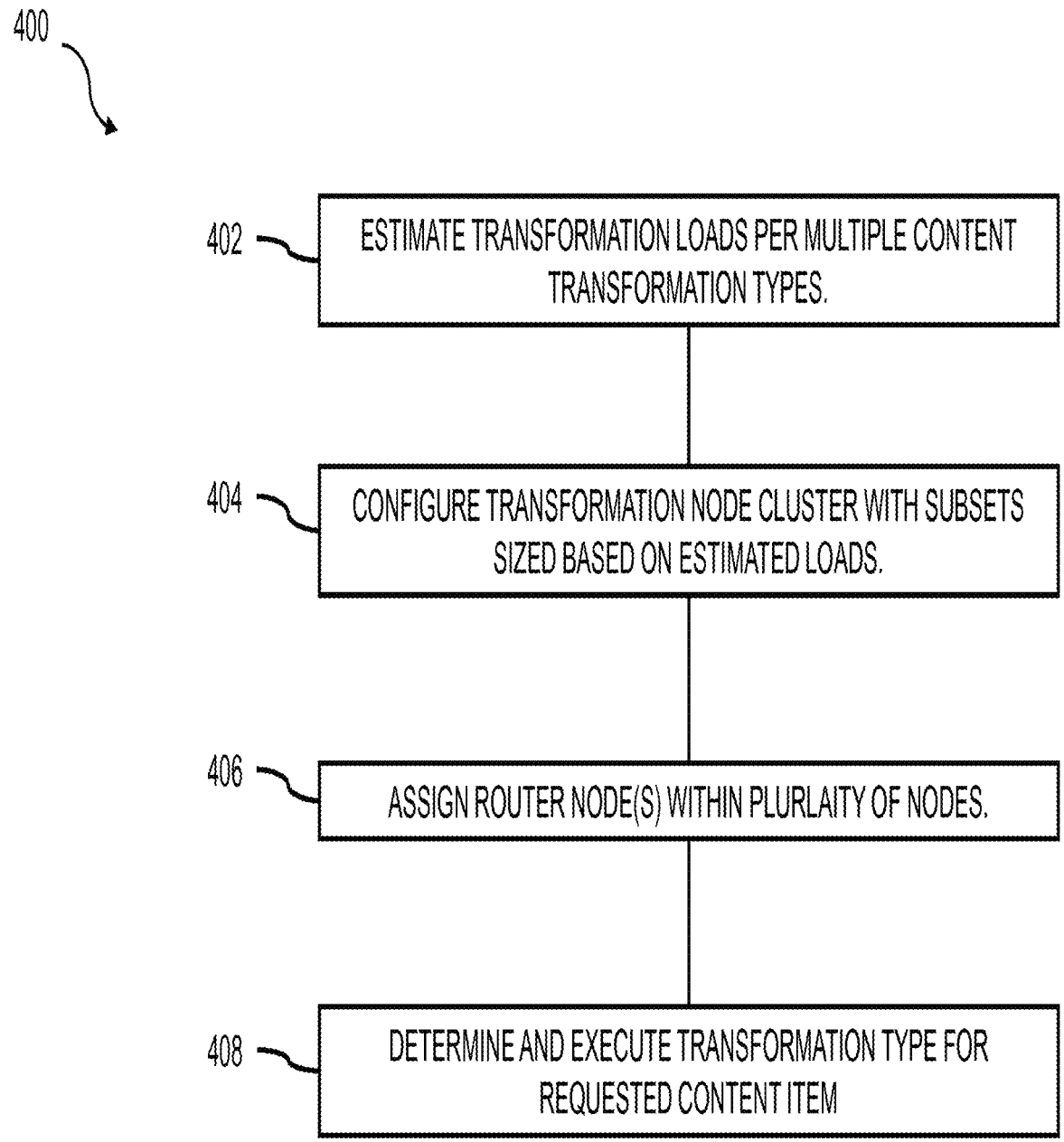
FIG. 4 shows a process flow diagram of a method for scaling cloud-based content transformations consistent with implementations of the current subject matter.

FIG. 4 is a process flow diagram of a method 400 for scaling cloud-based content transformations. These operations can optionally be performed by one or more computing systems that include computer hardware. For example, one or more of the nodes in the plurality of nodes can execute the following operations. At 402, an expected load for each of a plurality of transformation types is estimated for content item requests from one or more client machines relating to content items maintained in a content management system repository. Each transformation type of the plurality of transformation types transforms a first content format to a second content format differing from the first content format. For example, a transformation type can include conversion of a Microsoft Word™ formatted content item to a portable document format (PDF) formation, conversion of a PDF format to a several PDF formatted content items each including "chunks" (e.g. a subset of) the original number of pages in the PDF, conversion of a PDF formatted content item to a separate portable network graphics (PNG) image format for each page in the PDF content item, conversion of a PNG formatted content item to a joint photographic experts group (JPEG or JPG) formatted content item, conversion between a higher and a lower resolution image format in the JPG formatted content item, etc.

The estimating can include use of predictive models, machine learning, neural networks, etc. to make predictions based on the historical data. The estimating can be performed dynamically and automatically, for example by a machine (e.g. a system including at least one programmable processor and having access to one or more data storage devices) that accesses stored data pertaining to content transformation requests requested from the transformation node cluster. This stored data can be retained, optionally within a content management system repository such as those discussed above. As noted above, the callback from the router node 112 to the client machine can include a variety of information relating to the content request, how the transformation was performed, etc. Additionally, human input can also be used. For example, a human input to the estimating can include a request top configure additional nodes for a given transformation type based on knowledge that an upcoming product or project, a new customer, or the like will require a large number of a given type (or multiple given types) of transformations to be performed.

Consistent with implementations of the current subject matter, such information can be retained and used for making forward looking predictions of expected use of multiple types of content transformations. The stored callbacks can include some or all of previously requested content items, arrays of transformed content item references referencing intermediate content items created in transformation chains to produce transformed content items in response to the completed content item requests, listings of options specified in the content item requests, listings of operations performed to convert content items to target content formats, identifiers for transformation nodes that participated in the transformation chains, etc.

Additional input data can include any or all of a type and number of business process applications supported by the content management system repository, usage factors defined for content item transformations expected to be called by the business process applications, an absolute or relative amount of mobile device usage supported by the content management system repository, etc. The type and number of supported business applications can be predictive of the type of content transformations likely to be requested. For example, a contracts applications may frequently require generation of page images of a large document. Knowledge of the types of business applications that may make content item requests and/or the type, characteristics, sizes, etc. of content items that may be called by such business applications can be useful in estimating potential usage. Changes in mobile device usage can, for example, relate to changes in a number of requests for content transformations relating to producing content items in formats that have smaller file sizes to reduce bandwidth usage.

At 404, a transformation node cluster is configured. The transformation node cluster includes a plurality of nodes, and the configuring includes designating each of two or more subsets of the plurality of nodes for executing one of a plurality of content transformation types. In other words, a first subset of the nodes in the plurality of nodes is designated for one of the plurality of content transformation types, a second subset of the nodes in the plurality of nodes is designated for a second one of the plurality of content transformation types, etc. Each of the two or more subsets has a designated number of nodes of the plurality of nodes, and the number of nodes in each subset is based on the estimated load for the one of the plurality of transformation types for which that subset is designated. The number of each transformation node can be dynamically adjusted based on revised estimates, historical information such as real-time load information, or other load analytics or measurements.

At 406, one or more router nodes are assigned with the plurality of nodes. The one or more router nodes are configured to perform operations that include receiving content item request from the one or more client machines, identifying a current content format of a content item referenced in a received request of the content item requests and a target content format of the content item specified in the received request, and determining one or more required transformation types for the content item from the plurality of content transformation types. Based on this information, a router node is also configured to route the content item to an appropriate subset of the two or more subsets. An appropriate subset is one for which the content transformation type designated for that subset matches a required transformation type of the one or more required transformation types.

As noted above, producing a content item having the target format may require more than one transformation. Accordingly, the router node can be configured to determine a chain of transformations and to sequentially direct the execution of one or more intermediate transformation operations by routing the content item first to a cluster of the two or more clusters that includes nodes configured for a first content transformation type in the transformation chain and then routing a resultant intermediate content item (or multiple intermediate content items if the first transformation converts the content item to multiple intermediate content items, e.g. by a splitting operation or the like) to another cluster of the two or more clusters that includes nodes configured for a second content transformation type in the transformation chain. Router nodes can also be configured to route a reference for the content item in the target format back to the client machine that made the request. As noted above, the reference for the content item in the target format can take the form of a callback, which can include other items besides the reference to the content item in the target format.

At 408, a transformation type for the content item from the number of content transformation types is determined, and the router node routes the content item to one of the number of transformation nodes in the transformation node cluster. The transformation node to which the content item is routed is configured to execute the content transformation type determined for the content item. The router node can be intelligent with regards to selection of a transformation node to which to route a transformation request. For example, in addition to choosing a transformation node based on transformation type, the router node can also choose a least utilized (i.e. least busy) or at least a "less utilized" transformation node to which to route the transformation request. The selection of a less or least utilized transformation node can be based on real-time load information that is transmitted to the router node from each of the transformation nodes.

In a further implementation, a transformation node cluster can be capable of parallel transformation of a large content item. An amount of time (or alternatively, a number of processor cycles) required to perform a given content item transformation time is generally related to content item size. In other words, the larger the content item, the longer it generally will take to transform. The additional resources required to transform a larger content item can be provided in parallel (thereby increasing the speed with which content items or transformed and optionally providing a more consistent time to transform content items that is less dependent on the size of the content item) by multiple transformation nodes in a transformation cluster similar to those discussed above. To facilitate this parallel processing, a transformation node cluster can include a content item splitting transformation type. Transformation nodes of this type can split a content item into a number of smaller content items (chunks). In operation, a router node can route a request for transformation of a large content item first to a content item splitting node, which splits the content item into chunks. Then, the router node can route each chunk to a node configured for an appropriate transformation type, based on the target content format. As the transformation cluster can include multiple transformation nodes supporting any given transformation type, the chunks can be transformed in parallel. The router node can include logic or other intelligent processing routines that cause it to wait for the transformed chunks to become ready, and to assemble the transformed chunks into the final transformed content item, thereby ensuring the chunks are assembled in the correct order.

Other aspects, features, and operations of a router node consistent with implementations of the current subject matter may be better understood in light of the additional detail provided below. When transforming a content item from one format to another it can be useful to consider both of a number of transformations required to transform a content item from the source format to the target format and a number of content items generated from a content item transformation.

With regard to the number of transformations required, in some cases a direct transform cannot be made from the source format to the target format. Rather a chain of transformations may be required such that one or more intermediate transformations to one or more intermediate formats occur in the process of transforming the content item from the source format to the target format. As an example, a transformation of a content item from a DOCX format (e.g. a Microsoft Word™ document format) to a PNG (e.g. a portable network graphics image format), may occur by first transforming the content item from the DOCX source format to an intermediate format such as PDF (e.g. a portable document format), followed by transforming from the PDF intermediate format to the PNG target format. Chains including intermediate format transformations can typically include two to four (or optionally more) transformations. When a single transform is possible, this can be referred to as a direct transformation. If a chain of transformations is required, this can be referred to as an indirect transformation.

With regard to the number of content items generated from a transformation, it can be possible that a single source content item may need to be transformed into many target content items. For example, the transformation of a multiple page DOCX file to a PNG target format can involve generating multiple PNG target content items with PNG file representing a single page.

To further complicate matters, within a transformation chain (e.g. in an indirect transformation), any number of the transform steps may need to produce multiple content items. As an example, a typical transformation can include generation of thumbnail or preview images (one per page of the content item) from a content item having a source content of DOCX. In this case, the transformation chain for a multiple page DOCX source file could include a first transformation from DOCX to PDF and a second transformation from PDF to multiple PNG files (one per page) and then a third transformation to reduce the size of each PNG file to a thumbnail (e.g. as a transformation from a PNG intermediate format to a JPG target format).

Figure 5:
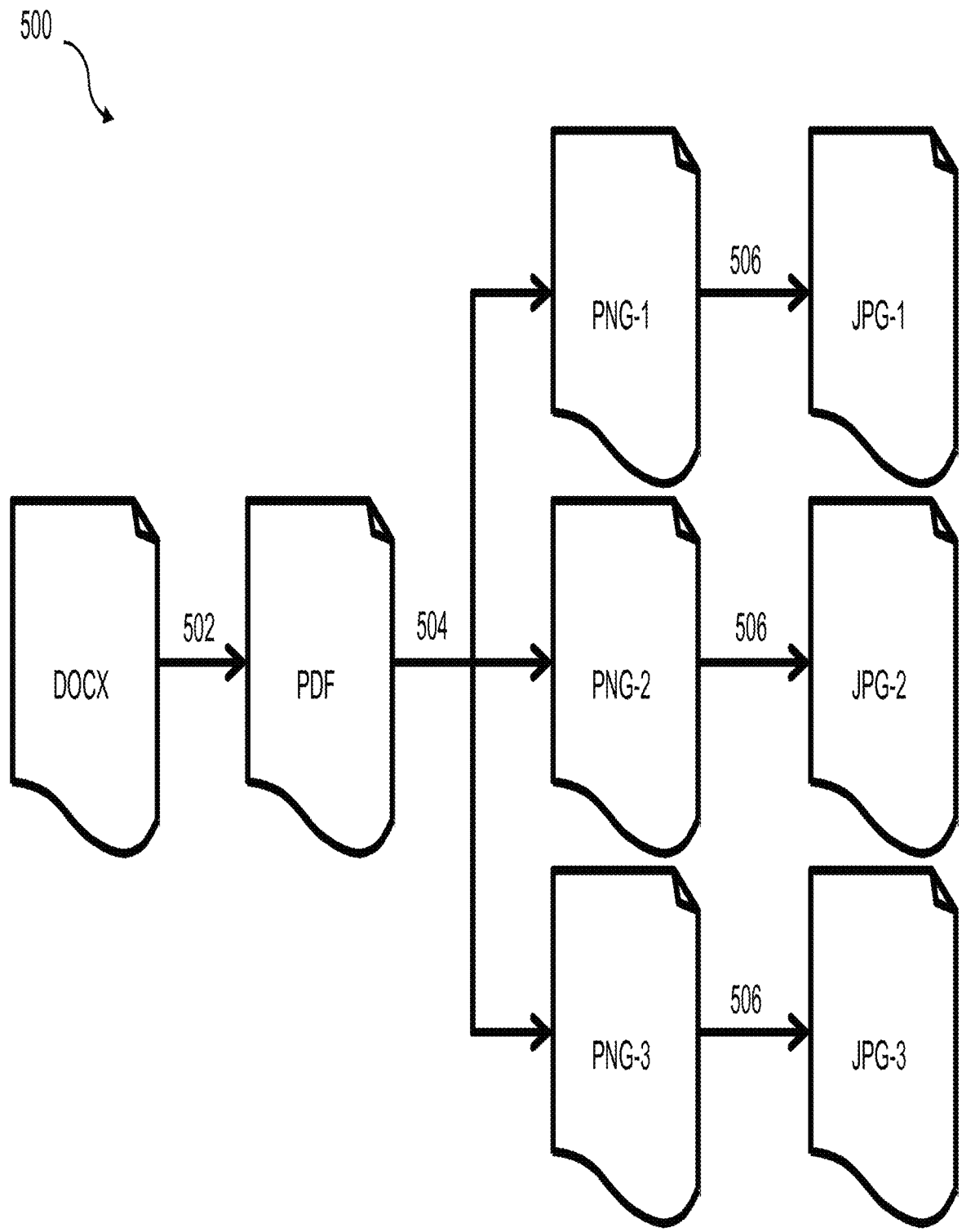
FIG. 5 shows an example of a transformation chain consistent with implementations of the current subject matter.

Therefore, for a DOCX file having three pages, the transformation chain 500 of FIG. 5 can occur. The first transformation 502 can include transforming the DOCX to a PDF intermediate format, followed by a second transformation 504 of the PDF file to three PNG files representing the three pages of the source DOCX file. A third transformation 506 includes transforming each of the three PNGs intermediate files to the target format JPG files.

If the source content item happened to have a large number of pages, the transformation chain 500 could further include an additional intermediate transformation prior to the PDF to split the DOCX into multiple chunks. Alternatively, the transformation node configured to convert DOCX to PDF can be configured to output the PDF intermediate format in 10 (or some other number) page chunks. In the example of a 300 page DOCX source content item, the transformation chain can include a first transformation to thirty ten-page PDF files followed by PDF to ten PNG file transformations for each of the PDF chunks and then PNG to JPG transformations for each of the 300 resulting PNG intermediate files.

In still another possible approach, the DOCX to PDF intermediate transformation 502 can occur as shown in FIG. 5, but then an additional intermediate transformation can occur to split the PDF into chunks.

The transformations in a transformation chain can be performed in parallel wherever possible. For example, as soon as a source content item for any transformation in the transformation chain becomes available, a request to transform it is made. To increase the number of parallel transforms, additional transformation nodes can be added to the cluster. The parallel nature of transforms means there is no guarantee on the order that they complete.

A router node consistent with the descriptions herein can handle all of the above transformation chaining, and can take into account that a transformation can result in multiple content items, and that subsequent transformations in the transformation chain can result in creation of a larger number of intermediate or target content items out, and that subsequent transformation steps cannot start until their predecessor transformations have taken place. Such a router can manage these demands in some example using asynchronous invocation of multiple transformation requests for a given context as well as indexed content references.

Asynchronous invocation of multiple transformation requests for a given context (in other words for a given source content item) can occur with a non-blocking wait for completion of all transformation requests. At run-time, when a non-blocking wait for multiple transformation requests is required, the router can create a transient handler that maintains the state required for sending the requests, waiting for their response, and handling errors (e.g. a response may never come back). Each request can be tagged with a handler context and a request identifier, so that when a response is received (e.g. containing the context and request identifier), it can be mapped back to the request that initiated it, and to the handler that is managing it. The handler then keeps a record of the responses received. When all responses are received (in whatever order they come back), the handler notifies the router that those transformations are now done, and that the router can move to the next transformation in the transformation chain, if there is one. If no further transformations are required to complete the transformation chain, the router responds to the client.

Indexed content references can assist in determining which segment of a content item is being processed. A segment can refer to a page number or group of page numbers of a source content item, but it could also represent paragraphs, time within video, or other parameters. An indexed content reference can include both the location of the content item and the index. A request to transform content includes the indexed content reference of the content item to transform. In a simple case where, for example, a DOCX file is transformed to PDF, a transformation request would be made including a content reference such as "item.docx-index 1", and the response would include a content reference such as "item.pdf-index 1". This indicates to the router to process the item.docx content item from page 1 (i.e. the beginning of the DOCX). In a more complex case where a large DOCX file is split into multiple PDFs (e.g. a 300 page DOCX split into 10 chunks), a transformation request would include the indexed content reference "item.doc-index 1" as before, but instead of returning a single indexed content reference, multiple indexed content references can be returned for each PDF chunk (e.g. "item.pdf-index 1", "item.pdf-index 30", "item.pdf-index 60" and so on for all 10 chunks. This means that when those returned indexed content references are used in subsequent transformation steps in the chain, the transformer node understands which part of the original content item it is working with. For example, the next transformation in a transformation chain may be to transform each PDF chunk into a series of PNGs (one for each page). In this case, one of the subsequent requests will include the indexed content reference "item.pdf-index 30". The transform type (PDF to PNG) will itself return an indexed content reference or indexed content references that is/are relative to its source indexed content reference. For example, in this case, the returned indexed content reference would be "item.png-index 30", "item.png-index 31", "item.png-index 32" and so on for the 10 pages of that PDF chunk. With indexed content references, the handler that is waiting for all the responses to be returned (and can be returned in any order) can now sort those quickly by content reference index to ensure that the transformed content items can be returned in the appropriate order to the client.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving, by a router node of a transformation node cluster comprising a plurality of nodes, a request from a client machine for a content item,
the request identifying the content item having a current content format that is to be transformed to a target content format for use by the client machine, the transformation node cluster further comprising a plurality of transformation nodes including at least a first transformation node and a second transformation node, the first transformation node being configured to transform the content item from the current content format to an intermediary content format and the second transformation node being configured to transform the content item from the intermediary content format to the target content format;

identifying, by the router node, the current content format of the content item and the target content format of the target content item, the target content format differing from the current content format;

determining one or more transformation types supported by the first transformation node and the second transformation node, the first transformation node and the second transformation node being configured to support multiple different transformation types such that if the first transformation node is unavailable to support a first transformation type, the second transformation node is made available to support the first transformation type;

routing, by the router node, the content item to the first transformation node, in response to determining that the first transformation node is available for and configured to support the transformation of the content item from the current content format to the intermediary content format;

routing, by the router node, the content item in the intermediary content format to the second transformation node, in response to determining that the second transformation node is available for and configured to support transforming the content item from the intermediary content format to the target content format;

tracking, by the router node, an efficiency metric indicative of progress of one or more content transformations by the plurality of transformation nodes for transforming the current target format to the target content format; and in response to determining that the efficiency metric is not met, updating assignments of the one or more transformation nodes to support newly defined transformation types such that the efficiency metric is improvable by assigning to at least the first transformation node ability to support a transformation type previously not supported by the first transformation node, responsive to a second transformation node not being available to support the transformation type.

2. The computer-implemented method in accordance with claim 1, wherein the one or more transformation types comprise a transformation type that includes transforming the content item from the current content format comprising a portable document format into the target content format, which comprises the content item split into two or more sections in the portable document format, reassembling the two or more sections to form the target content item.

3. The computer-implemented method in accordance with claim 1, wherein the one or more transformation types include transforming the content item from the current content format in an editable text document format into a target content format of an image format.

4. The computer-implemented method in accordance with claim 1, wherein a number of the plurality of transformation nodes in the transformation node cluster configured to execute at least one of the plurality of content transformation types is based on an estimate of transformation loads of different transformation types to be handled by the transformation node cluster.

5. The computer-implemented method in accordance with claim 1, further comprising:
estimating a load for at least one transformation type; and
configuring a number of the plurality of transformation nodes in the transformation node cluster configured to execute at least one of the plurality of content transformation types based on the estimated load for at least one transformation type.

6. The computer-implemented method in accordance with claim 1, wherein the one or more transformation types determined by the router comprise a transformation chain comprising a plurality of transformation types, and wherein the one of the plurality of transformation nodes in the transformation node cluster has a first transformation type to transform the content item to a first intermediate content item having a first intermediate format, and wherein the method further comprises:
routing the first intermediate content item to a second node of the plurality of transformation nodes in the transformation node cluster having a second transformation type to transform the first intermediate content item to either a second intermediate content item having a second intermediate format or to a target content item having the target format.

7. The computer-implemented method in accordance with claim 6, wherein the transformation chain comprises a transformation type resulting in formation of multiple intermediate content items, and at least one of the multiple intermediate content items requires a subsequent transformation.

8. The computer-implemented method in accordance with claim 7, wherein the method further comprises:
routing, by the router, the multiple intermediate content items to multiple transformation nodes in the transformation node cluster, the multiple transformation nodes at least one being configured to execute a same one of a plurality of content transformation types such that the multiple intermediate content items are processed in parallel.

9. The computer-implemented method in accordance with claim 1, wherein at least one of the plurality of transformation nodes is configured to execute only one of the plurality of content transformation types.

10. The computer-implemented method in accordance with claim 1, further comprising providing a callback, by the router node to the client machine, the callback comprising a reference to a transformed content item having the target content format.

11. The computer-implemented method in accordance with claim 10, wherein the callback further comprises at least one of a reference to the content item requested by the client machine, an array of transformed content item references referencing one or more intermediate content items created in a transformation chain to produce the transformed content item, a listing of options specified in the request, a history of operations performed to convert the content item to the target content format, and identifiers for one or more transformation nodes that participated in the transformation chain.

12. The computer-implemented method of claim 1, further comprising:
creating, by the router, a transient handler, the transient handler managing the request;
tagging the request with a handler context and a request identifier;
mapping a response received from the one of the plurality of transformation nodes and containing the handler context and request identifier back to the request and to the transient handler, the transient handler keeping a record of the response and notifying the router when all transformations of a first transformation type of the one or more transformation types has been completed; and
routing, by the router, intermediate content items resulting from the first transformation type to one or more additional nodes of the plurality of transformation nodes in the transformation node cluster, the one or more additional nodes of the plurality of transformation nodes being configured to transform the intermediate content items to one or more next intermediate content items or to the target content format of the content item.

13. The method of claim 1, wherein a timing or efficiency threshold is monitored in association with the one or more content transformations, and in response to determining that the threshold is met, at least one of the transformation nodes is reassigned from a first transformation type to a second transformation type.

14. A computer program product comprising a non-transitory machine-readable medium storing instructions that, when executed by at least one programmable processor, cause the at least one programmable processor to perform operations comprising:
   receiving, by a router node, a request from a client machine for a content item stored in a repository in a target format;
   identifying, by the router node, a current content format of the content item and determining a series of content transformations needed to transform the content item from the current content format to the target content format according to the request;
   determining one or more transformation nodes controlled by the router node, the one or more transformation nodes configured to support one or more transformation types for transforming the content item from the current content format to the target format;
   tracking, by the router node, an efficiency metric indicative of progress of one or more content transformations by the one or more transformation nodes for transforming the current target format to the target content format;
   in response to determining that the efficiency metric is not met, updating assignments of the one or more transformation nodes to support newly defined transformation types such that the efficiency metric is improvable by assigning to at least a first transformation node ability to support a first transformation type previously not supported by the first transformation node, responsive to a second transformation node not being available to support the first transformation type; and
   routing, by the router node, the content item to the first transformation node.

15. The computer program product in accordance with claim 14, wherein a number of a plurality of transformation nodes in a transformation node cluster configured to apply the one or more content transformation types is based on an estimate of transformation loads of different transformation types to be handled by the transformation node cluster.

16. The computer program product in accordance with claim 15, wherein the operations further comprise:
   estimating a load for at least one transformation type; and
   configuring a number of the plurality of transformation nodes in the transformation node cluster configured to execute at least one of the plurality of content transformation types based on the estimated load for at least one transformation type.

17. The computer program product in accordance with claim 15, wherein the one or more transformation types determined by the router comprise a transformation chain comprising a plurality of transformation types, and wherein the one of the plurality of transformation nodes in the transformation node cluster has a first transformation type to transform the content item to a first intermediate content item having a first intermediate format, and wherein the operations further comprise:
   routing the first intermediate content item to a second node of the plurality of transformation nodes in the transformation node cluster having a second transformation type to transform the first intermediate content item to either a second intermediate content item having a second intermediate format or to a target content item having the target format.

18. The computer program product in accordance with claim 17, wherein the transformation chain comprises a transformation type resulting in formation of multiple intermediate content items, and at least one of the multiple intermediate content items requires a subsequent transformation, and wherein the operations further comprise:
   routing, by the router, the multiple intermediate content items to multiple transformation nodes in the transformation node cluster, the multiple transformation nodes at least one being configured to execute a same one of a plurality of content transformation types such that the multiple intermediate content items are processed in parallel.

19. The computer program product in accordance with claim 15, wherein the operations further comprise:
   creating, by the router, a transient handler, the transient handler managing the request;
   tagging the request with a handler context and a request identifier;
   mapping a response received from at least the first transformation node of the one of the plurality of transformation nodes and containing the handler context and request identifier back to the request and to the transient handler, the transient handler keeping a record of the response and notifying the router when all transformations of a first transformation type of the one or more transformation types has been completed; and
   routing, by the router, intermediate content items resulting from the first transformation type to at least the second transformation node of one or more additional nodes of the plurality of transformation nodes in the transformation node cluster, the one or more additional nodes of the plurality of transformation nodes being configured to transform the intermediate content items to one or more next intermediate content items or to the target content format of the content item.

20. A computer-implemented system having one or more processors, the system further comprising:
   a router node receiving a request from a client machine for a content item stored in a repository associated with a server machine,
   the router node communicating with a transformation node cluster comprising a plurality of transformation nodes,
   at least one of the plurality of transformation nodes being configured to execute at least one of a plurality of content transformation types;
   identifying, by the router node, a first content format associated with the content item and a second content format to which the content item is to be transformed by way of one or more content transformations performed by one or more transformation nodes;
   in response to the request, the router node identifying one or more content transformation types for transforming the content item to the second content format;
   the router node tracking progress of the one or more content transformations to effect a reassembly of sub-parts of the content item, in response to the content item having been divided into the sub-parts such that at least a first sub-part is transformed by a first transformation node and a second sub-part is transformed by a second transformation node; and the router node, in response to detecting that the request is satisfied, executing a callback routine to notify the client machine about a location in the repository where the transformed content item is stored, the first transformation node and the second transformation node in the transformation node cluster being respectively associated with a first transformation type and a second transformation type, the first transformation type being different from the second transformation type such that the first transformation type is assigned to the first transformation node and the second transformation type is assigned to the second transformation node according to a self-configuration mechanism that seeks to balance transformation load among one or more transformation nodes in a cluster of nodes, in accordance with the transformation types supported by at least one of the first transformation node and the second transformation node, a designated number of transformation nodes being configured to support a designated number of transformation types and the first transformation node being dynamically adjusted based on at least one of revised estimates, historical information about real-time load information, or other load analytics or measurements to support a different or additional transformation type to transform the content item to a first intermediate content item having a first intermediate format, and the second transformation node being configured to transform the first intermediate content item to either a second intermediate content item having a second intermediate format or to a target content item having the target format.

\* \* \* \* \*